(12) United States Patent
Yamazaki

(10) Patent No.: US 10,712,191 B1
(45) Date of Patent: Jul. 14, 2020

(54) THERMAL FLOWMETER AND METHOD OF FLOW RATE CORRECTION

(71) Applicant: AZBIL CORPORATION, Chiyoda-ku (JP)

(72) Inventor: Yoshio Yamazaki, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/804,087

(22) Filed: Feb. 28, 2020

(30) Foreign Application Priority Data

Mar. 4, 2019 (JP) .................................. 2019-038315

(51) Int. Cl.
*G01F 1/86* (2006.01)
*G01F 1/69* (2006.01)
*G01F 1/699* (2006.01)
*G01K 13/02* (2006.01)

(52) U.S. Cl.
CPC ................ *G01F 1/86* (2013.01); *G01F 1/699* (2013.01); *G01K 13/02* (2013.01)

(58) Field of Classification Search
CPC ..................................... G01F 1/86; G01F 1/69
See application file for complete search history.

(56) References Cited

U.S. PATENT DOCUMENTS

| 6,988,418 B2 * | 1/2006 | Koudal ................. G01F 1/3209 73/861.22 |
| 9,823,666 B2 * | 11/2017 | Ulens ........................ E03B 7/08 |
| 2017/0276527 A1 * | 9/2017 | Chen ..................... G01F 1/6842 |
| 2020/0032494 A1 * | 1/2020 | Trescott ................ G01M 3/002 |

FOREIGN PATENT DOCUMENTS

JP          11-132812          5/1999

* cited by examiner

*Primary Examiner* — Jewel V Dowtin
(74) *Attorney, Agent, or Firm* — Oblon, McClelland, Maier & Neustadt, L.L.P.

(57) ABSTRACT

A thermal flowmeter includes a tube, a temperature measuring device disposed on the tube and detecting a first temperature of a fluid, a heating and temperature measuring device disposed on the tube and detecting a second temperature of the fluid, a controller causing the heating and temperature measuring device to generate heat, a power determining unit determining a power consumption of the heating and temperature measuring device, a flow rate obtaining unit converting the power consumption into a flow rate, a flow rate correcting unit correcting the flow rate, a memory unit storing a first zero-point power consumption, a zero-point power ratio calculating unit calculating a zero-point power ratio based on the first zero-point power consumption and a second zero-point power consumption, and a setting unit calculating a correction factor based on the zero-point power ratio and setting the correction factor in the flow rate correcting unit.

10 Claims, 20 Drawing Sheets

THERMAL FLOWMETER AND METHOD OF FLOW RATE CORRECTION

CROSS-REFERENCE TO RELATED APPLICATIONS

The present application is based on and claims priority to Japanese Application No. 2019-038315, filed Mar. 4, 2019, the entire contents of which are incorporated herein by reference.

BACKGROUND

1. Field

The present disclosure relates to a thermal flowmeter that measures temperatures of a fluid at upstream and downstream positions, or two positions, on a tube, controls a heater to maintain the difference between the temperatures at the two positions at a predetermined value, and calculates the flow rate of the fluid from power supplied to the heater.

2. Description of the Related Art

A typical thermal flowmeter calculates the flow rate of a fluid from the difference between the temperature of the fluid at an upstream position relative to a heater and that at a downstream position relative to the heater or from the power consumption of the heater while the heater is driven and heated to a predetermined temperature that is, for example, 10° C. higher than that of the fluid. It is known that a sensor output changes depending on the physical properties, such as thermal conductivity, specific heat, density, and viscosity, of a fluid (refer to, for example, Japanese Unexamined Patent Application Publication No. 11-132812).

FIG. 21 is a diagram illustrating the principle of a thermal flowmeter that determines the flow rate of a fluid based on the power consumption of a heater. As illustrated in FIG. 21, the thermal flowmeter includes a tube 100 through which a target fluid is caused to flow, a fluid temperature sensor 101, and a heater 102. The fluid temperature sensor 101 and the heater 102 are arranged on the tube 100. The heater 102 is caused to generate heat such that the difference (TRh−TRr) between a temperature TRh at the heater 102 and a temperature TRr at the temperature sensor 101 is maintained constant. The flow rate, Q, of the fluid has a reproducible correlation with the power consumption (hereinafter, also referred to as "heater power consumption), P, of the heater 102. The flow rate Q can be calculated from the power consumption P.

The heater power consumption P (mW) is simply expressed by the following equation, as is known.

$$P = (A + B\sqrt{u})\Delta T \quad (1)$$

In Equation (1), A and B denote constants determined by, for example, the shape of a tube and the thermal conductivity, density, viscosity, and specific heat of a fluid, $\mu$ denotes the flow rate (mL/min), and $\Delta T$ denotes the heating temperature (° C.) of the heater 102. FIG. 22 illustrates an example of the relationship between the heater power consumption P and the flow rate Q.

The constants A and B in Equation (1) change depending on, for example, the thermal conductivity of a fluid. As illustrated in FIG. 23, the relationship between the heater power consumption P and the flow rate Q of a fluid depends on the kind of fluid. FIG. 23 illustrates different fluids, that is, water, hydrogen peroxide (10%), sulfuric acid (10%), hydrogen peroxide (30%), sulfuric acid (30%), ammonia (100%), sulfuric acid (60%), hydrogen peroxide (50%), sulfuric acid (98%), and isopropyl alcohol. Since the relationship between the heater power consumption P and the flow rate Q differs from fluid to fluid as described above, a user needs to set the kind of a target fluid in a flowmeter in advance.

However, if the fluid is changed to another fluid after setting or if the kind of fluid is unknown, the heater power consumption P will fail to be accurately converted into the flow rate Q, causing an error in flow rate determination.

FIG. 24 is a graph illustrating the relationships between true flow rates of different fluids and flow rates outputted from a thermal flowmeter where each fluid was caused to flow through a tube of the flowmeter after the kind of a target fluid was set to water ($H_2O$). FIG. 24 demonstrates that a change of the kind of fluid after setting caused an error in flow rate outputted from the thermal flowmeter.

SUMMARY

The present disclosure has been made to overcome the above-described disadvantages and aims to provide a thermal flowmeter capable of accurately determining the flow rate of a fluid flowing through a tube if the kind of fluid is changed, and a method of flow rate correction.

According to an aspect of the present invention, a thermal flowmeter includes a tube through which a target fluid is caused to flow, a temperature measuring device disposed on the tube and configured to detect a first temperature of the fluid, a heating and temperature measuring device disposed on the tube downstream of the temperature measuring device in a fluid flow direction and configured to detect a second temperature of the fluid, a controller configured to supply power to the heating and temperature measuring device to generate heat such that the second temperature is higher than the first temperature by a predetermined value, a power determining unit configured to determine a power consumption of the heating and temperature measuring device, a flow rate obtaining unit configured to convert the determined power consumption into a flow rate of the target fluid, a flow rate correcting unit configured to correct the flow rate using a set correction factor, a memory unit storing, as a first zero-point power consumption, a power consumption obtained under conditions where the tube is filled with a reference fluid and flow of the reference fluid is stopped, a zero-point power ratio calculating unit configured to calculate a zero-point power ratio based on the first zero-point power consumption and a second zero-point power consumption that is a power consumption determined by the power determining unit under conditions where flow of the target fluid in the tube is stopped, and a setting unit configured to calculate the correction factor based on the zero-point power ratio and set the correction factor in the flow rate correcting unit.

In this aspect, the flow rate obtaining unit may convert the determined power consumption into the flow rate of the target fluid using a set flow rate conversion formula or table. The flow rate conversion formula or table may be previously adjusted for the reference fluid.

In this aspect, the zero-point power ratio calculating unit may obtain the first zero-point power consumption stored in the memory unit and the second zero-point power consumption determined by the power determining unit in response to an inputted fluid-stopped-state signal indicating that the flow of the target fluid is stopped, and calculate the zero-point power ratio based on the first and second zero-point power consumptions.

In this aspect, the zero-point power ratio calculating unit may calculate the zero-point power ratio as (Zero_F−Zero_W)/Zero_W or Zero_F/Zero_W where Zero_W denotes the first zero-point power consumption and Zero_F denotes the second zero-point power consumption.

In this aspect, the setting unit may calculate the correction factor from the zero-point power ratio using a predetermined cubic equation.

Another aspect of the present disclosure provides a method of flow rate correction for a thermal flowmeter including a tube through which a target fluid is caused to flow, a temperature measuring device that is disposed on the tube and detects a first temperature of the target fluid, and a heating and temperature measuring device that is disposed on the tube downstream of the temperature measuring device in a fluid flow direction and detects a second temperature of the target fluid. The method includes a first step of supplying power to the heating and temperature measuring device to generate heat such that the second temperature is higher than the first temperature by a predetermined value, a second step of determining a power consumption of the heating and temperature measuring device, a third step of converting the determined power consumption into a flow rate of the target fluid, a fourth step of correcting the flow rate using a set correction factor, a fifth step of obtaining a first zero-point power consumption, which is a power consumption obtained under conditions where the tube is filled with a reference fluid and flow of the reference fluid is stopped, from a memory unit and calculating a zero-point power ratio based on the first zero-point power consumption and a second zero-point power consumption, which is a power consumption determined in the second step under conditions where flow of the target fluid in the tube is stopped, and a sixth step of calculating the correction factor based on the zero-point power ratio and setting the correction factor as that to be used in the fourth step.

According to the present disclosure, the zero-point power ratio is calculated, and the correction factor is calculated from the zero-point power ratio. The correction factor can be used to reduce the effects of variations between thermal flowmeters on the accuracy of determination. The flow rate can be accurately determined if the fluid flowing through the tube is changed to another fluid. Furthermore, since the setting unit automatically sets the correction factor in the present disclosure, a user can readily set up the thermal flowmeter by merely stopping the flow of a fluid when the fluid is fed to the thermal flowmeter for the first time, just after the user changes the kind of fluid, or when the kind of fluid seems to have been changed.

DETAILED DESCRIPTION

Description of Prior Application

A method developed by the inventor and described in Japanese Patent Application No. 2018-067090 will first be described before description of the present disclosure.

As described with reference to FIG. 23, the power consumption versus flow rate characteristic curve depends on the kind of fluid in a tube, or differs from fluid to fluid. Difference in characteristic curve between the fluids can be observed while the flow of each fluid in the tube is stopped, or in a fluid-stopped state.

Figure 1:
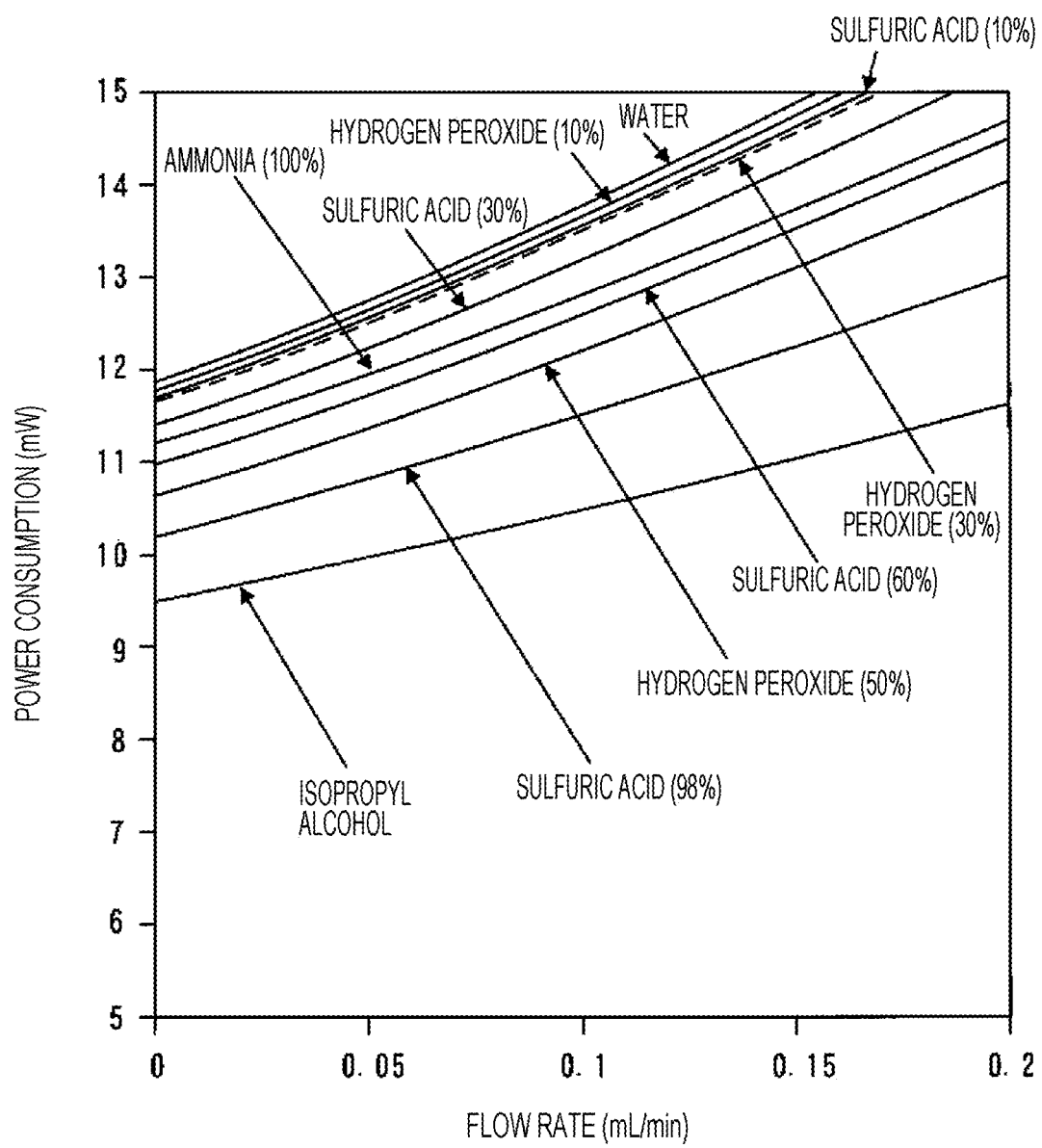
FIG. 1 is an enlarged graph illustrating heater power consumption versus flow rate characteristic curves at and close to the zero flow rate of different fluids each flowing through a tube of a thermal flowmeter.
Figure 23:
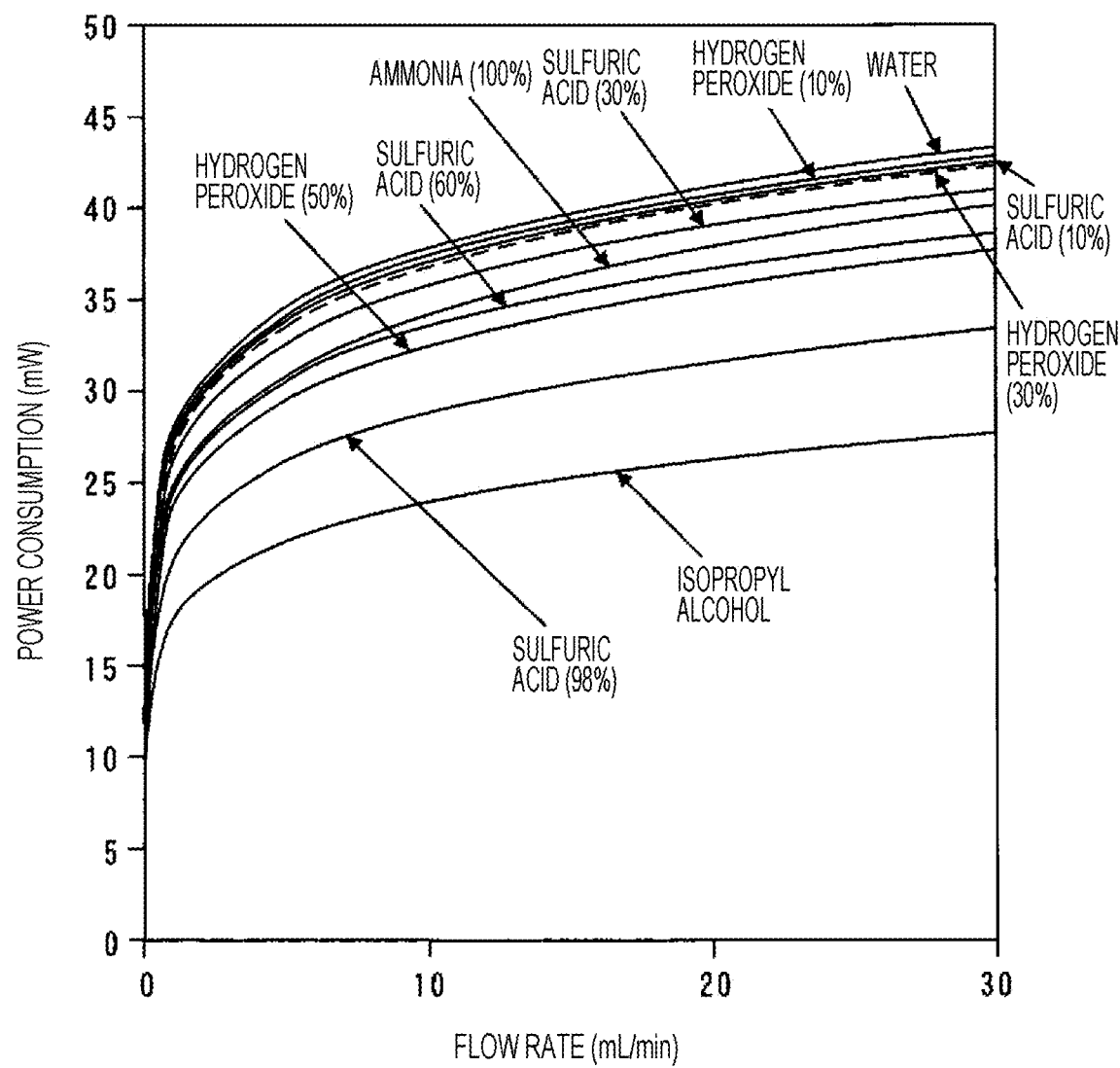
FIG. 23 is a graph illustrating the relationships between the heater power consumptions and the flow rates of different fluids flowing through a tube of a thermal flowmeter.
Figure 24:
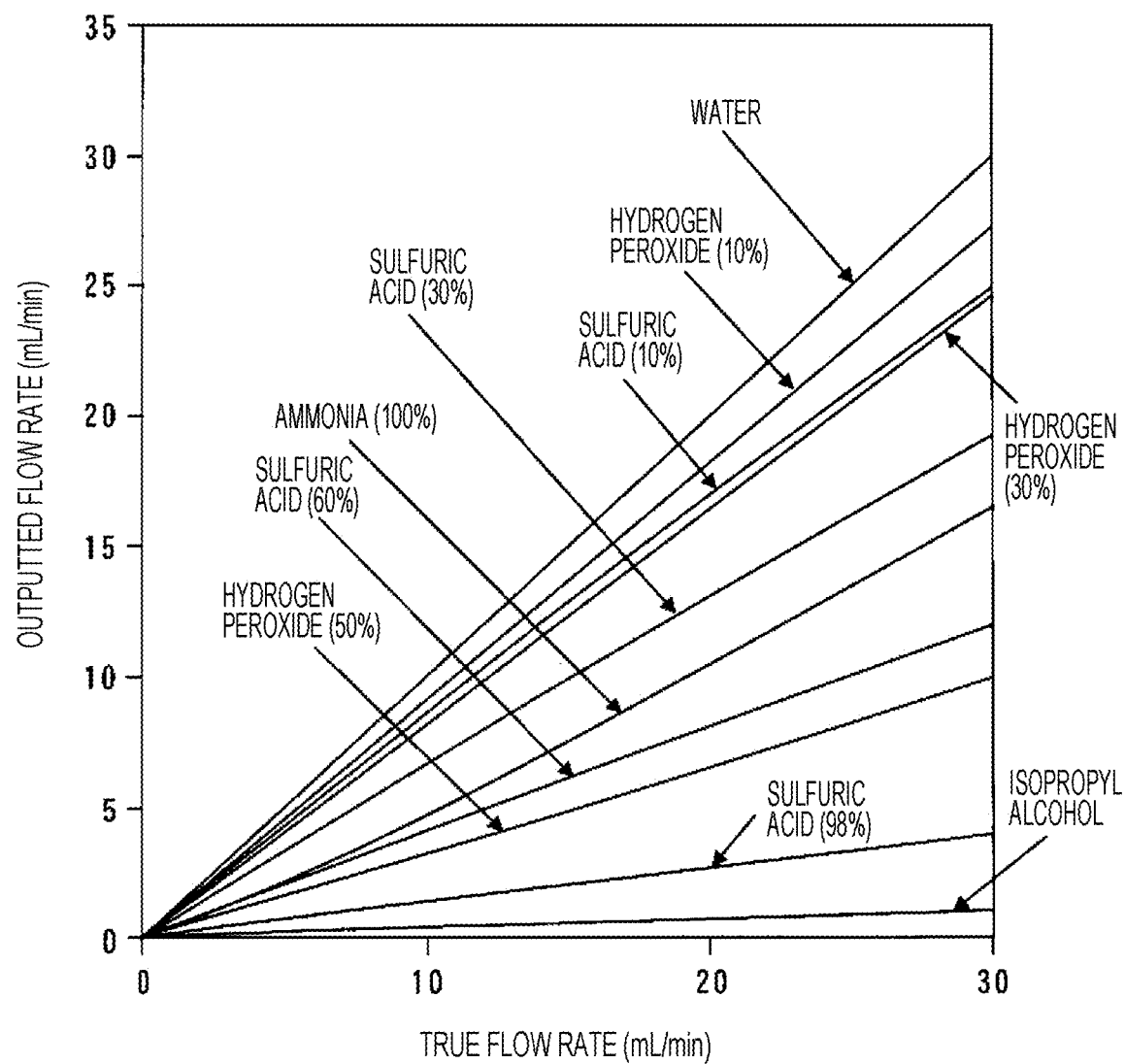
FIG. 24 is a graph illustrating the relationships between true flow rates of different fluids and flow rates outputted from a thermal flowmeter where each fluid was caused to flow through a tube of the flowmeter after the kind of fluid was set to water.

FIG. 1 is an enlarged graph illustrating the characteristic curves at and close to the zero flow rate (fluid-stopped state) in FIG. 23. As is evident from FIG. 1, while the flow of each fluid in the tube is stopped, the heater power consumption P changes depending on the kind of fluid. A change in power consumption in the fluid-stopped state correlates with a change in power consumption in a fluid-flowing state. A heater power consumption P at the zero flow rate (hereinafter, also referred to as "zero-point heater power consumption") can be readily determined when the flow of a fluid is stopped at a site where the thermal flowmeter is installed. Specifically, a user closes valves arranged upstream and downstream of the tube of the thermal flowmeter in a fluid flow direction to stop the flow of the fluid just after the user changes the kind of fluid or when the kind of fluid seems to have been changed.

The thermal flowmeter obtains a heater power consumption P when the flow of the fluid is stopped, and selects a flow rate conversion formula or table suitable for this power consumption P. The flow conversion formula or table for the kind of fluid can be set in the above-described manner. The flow rate conversion formula or table can be used to convert the heater power consumption P in the fluid-flowing state into a flow rate Q.

Figure 2:
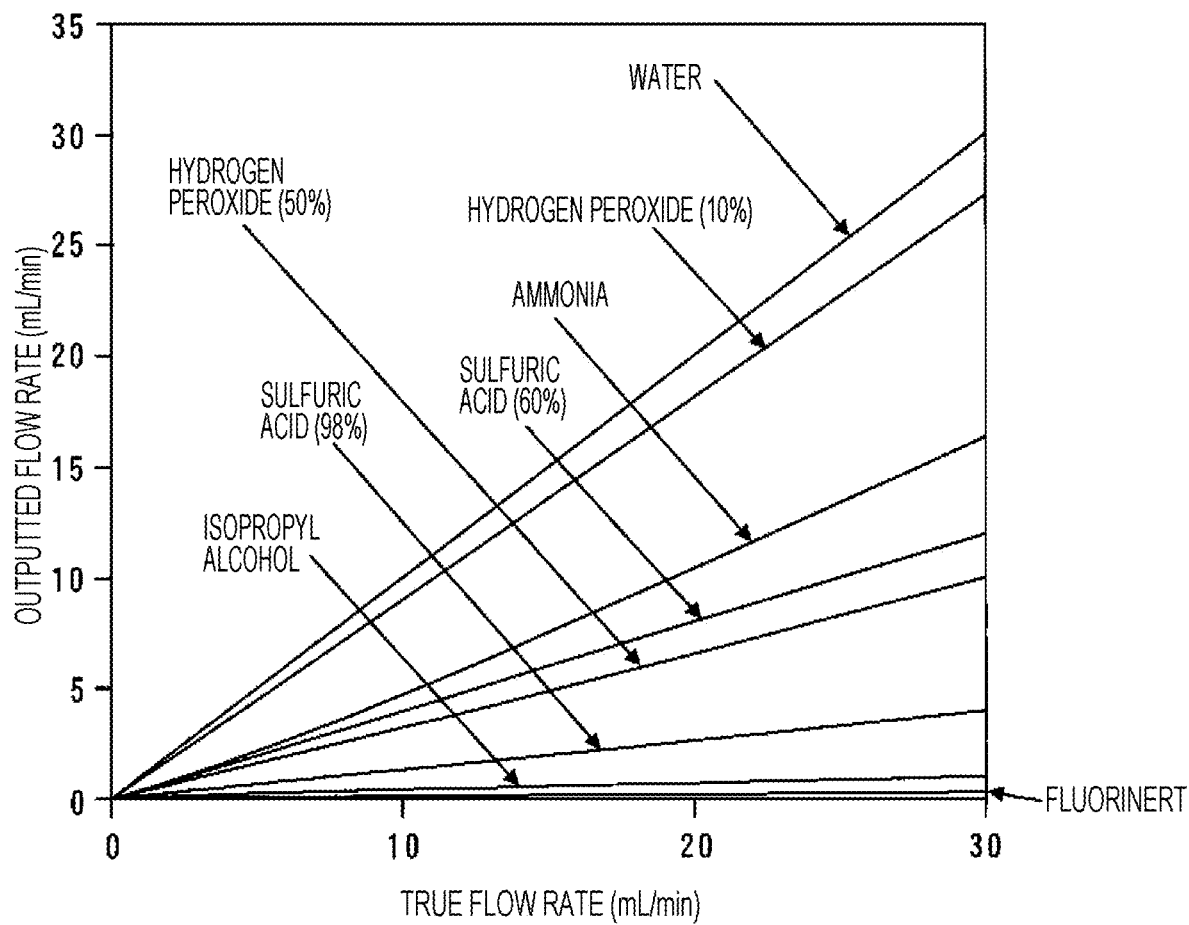
FIG. 2 is a graph illustrating the relationships between true flow rates of different fluids and flow rates outputted from a thermal flowmeter where each fluid was caused to flow through a tube of the flowmeter after a flow rate conversion formula or table for water, serving as a target fluid, was set.

FIG. 2 is a graph illustrating the relationships between true flow rates of different fluids and flow rates outputted from a thermal flowmeter where each fluid was caused to flow through a tube of the thermal flowmeter after a flow rate conversion formula or table for water ($H_2O$), serving as a target fluid, was set.

Figure 3:
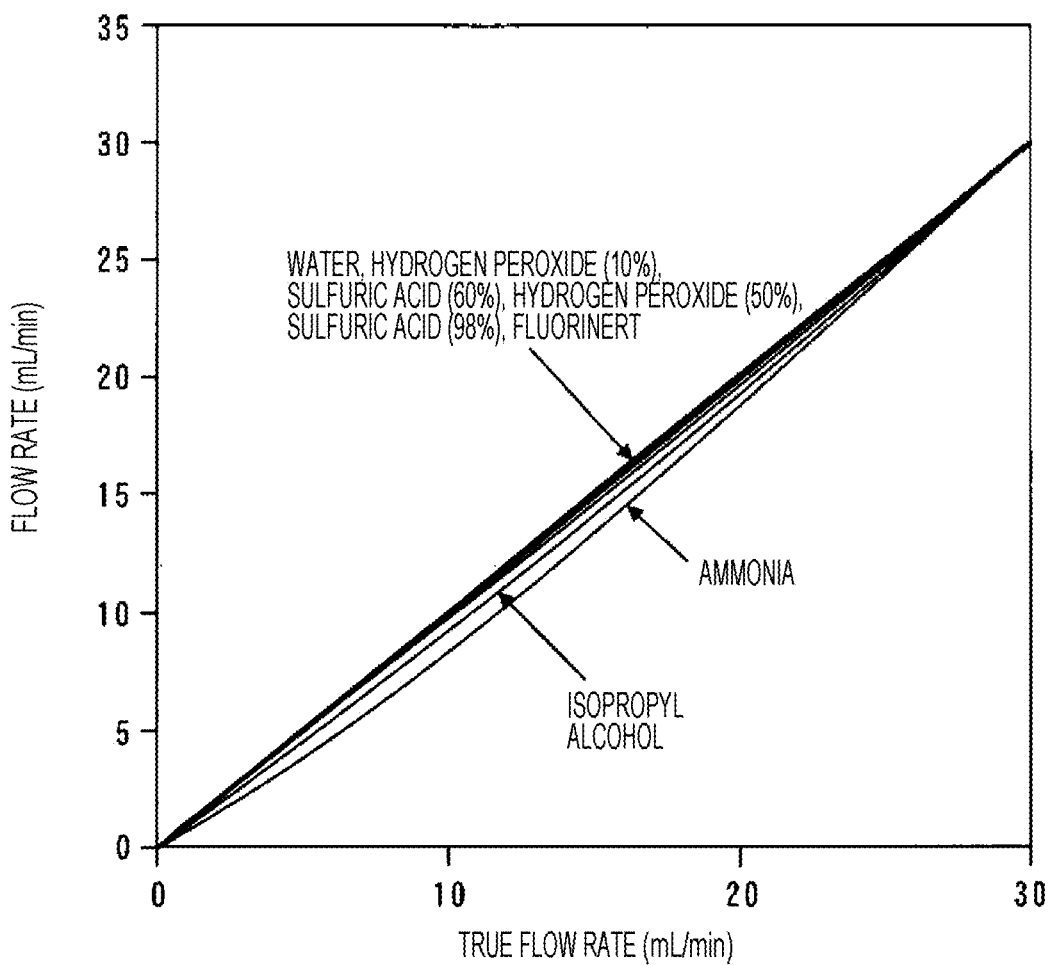
FIG. 3 is a graph illustrating the relationships between true flow rates of the different fluids and flow rates outputted from a thermal flowmeter in a prior application.

FIG. 3 is a graph illustrating the relationships between true flow rates of the different fluids and flow rates outputted from a thermal flowmeter where the flow rate conversion formula or table was changed and set in the manner described in Japanese Patent Application No. 2018-067090 every time the fluid in a tube was changed to another fluid. The different fluids in FIGS. 2 and 3 are water, hydrogen peroxide (10%), ammonia, sulfuric acid (60%), hydrogen peroxide (50%), sulfuric acid (98%), isopropyl alcohol, and Fluorinert (registered trademark).

As described above, the flow rate conversion formula or table suitable for the kind of fluid can be set in the manner described in Japanese Patent Application No. 2018-067090.

However, variations between thermal flowmeters cause variations in zero-point heater power consumption. Specifically, thermal characteristics around a sensor differ from product to product due to, for example, different thicknesses of glass tubes. This leads to variations in zero-point power consumption for the same fluid. The method described in Japanese Patent Application No. 2018-067090 may fail to give accurate flow rate determination because a wrong flow rate conversion formula or table may be selected based on a zero-point heater power consumption.

Principle of Disclosure

Figure 4:
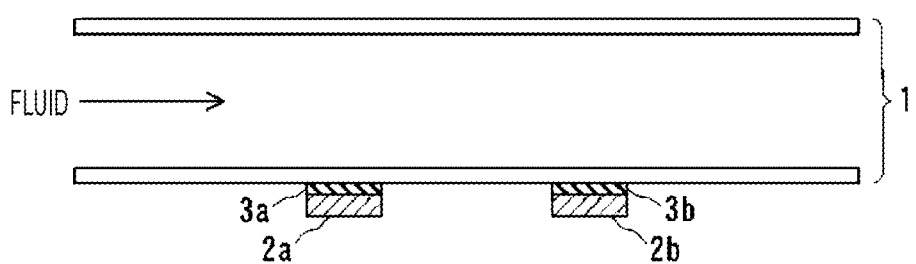
FIG. 4 is a diagram illustrating the principle of a thermal flowmeter according to the present disclosure.

The principle of the present disclosure will now be described. As illustrated in a sectional view of FIG. 4, a tube 1 made of, for example, glass, and adhesive 3a and 3b are located between a fluid and each of a temperature measuring device 2a (fluid temperature sensor unit) and a heating and temperature measuring device 2b (heater sensor unit). Heat is transferred between the fluid and each of the temperature measuring device 2a and the heating and temperature measuring device 2b through the tube 1 and the adhesive 3a or 3b.

The thickness of each of the tube 1 and the adhesive 3a and 3b slightly varies from thermal flowmeter to thermal flowmeter, or from product to product. Furthermore, the thermal characteristics of the temperature measuring device 2a and the heating and temperature measuring device 2b also vary from product to product. Consequently, as described above, the zero-point heater power consumption differs from product to product for the same fluid.

Figure 5:
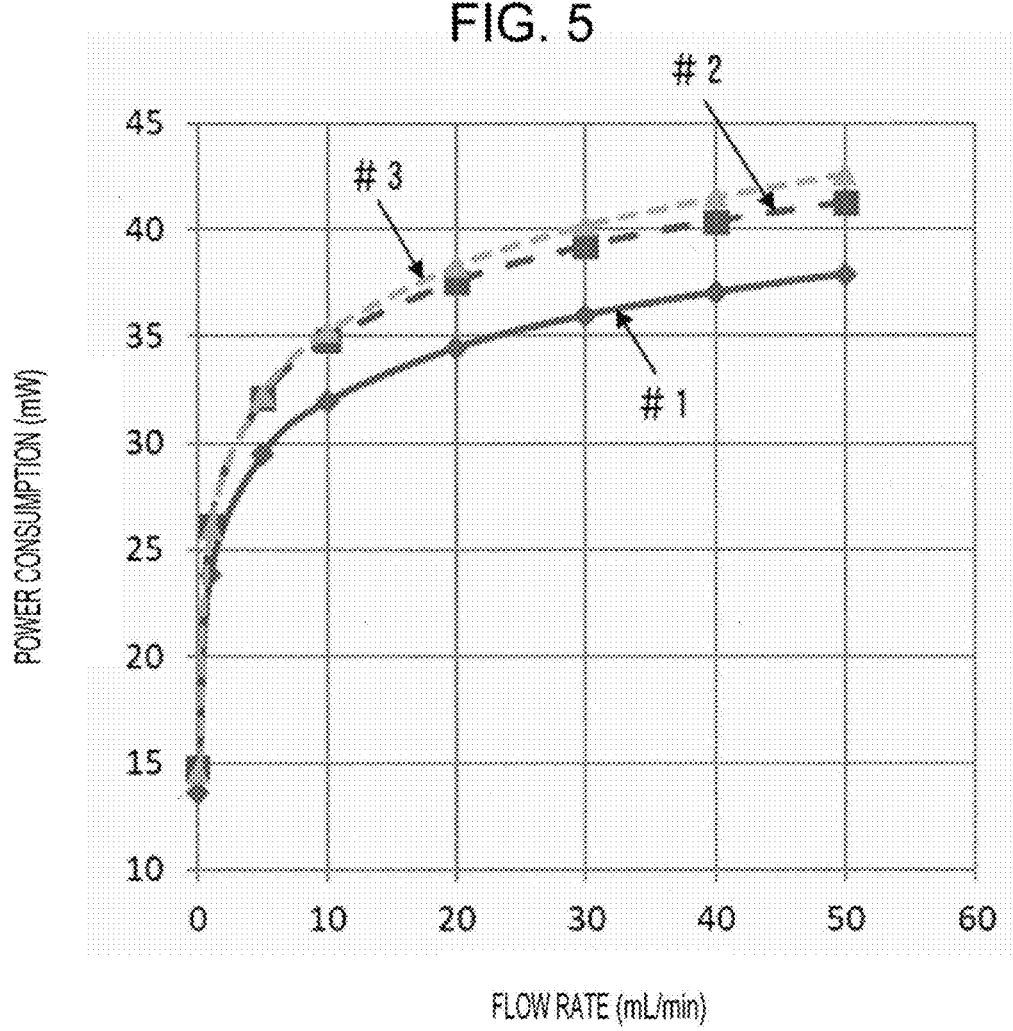
FIG. 5 is a graph illustrating the relationships between the heater power consumptions and the flow rates of a first fluid flowing through tubes of three thermal flowmeters.
Figure 6:
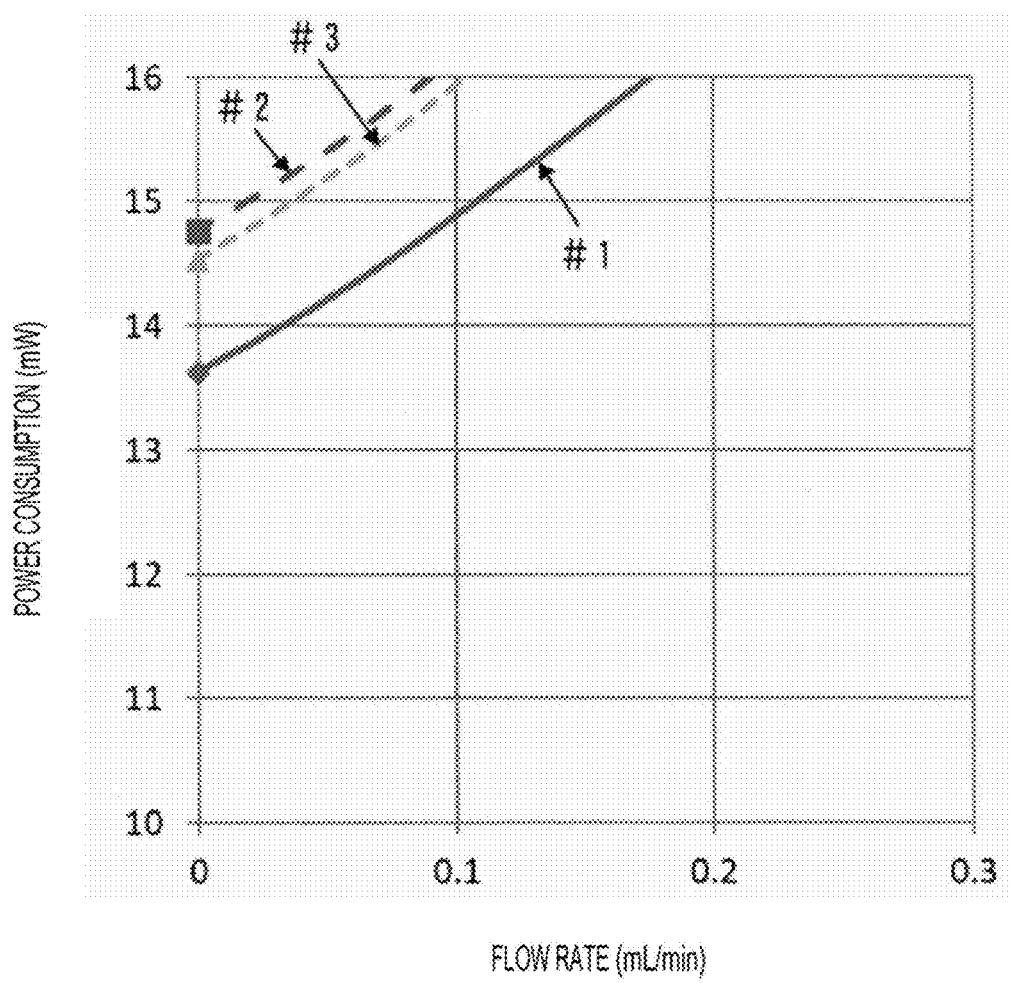
FIG. 6 is an enlarged graph illustrating the heater power consumption versus flow rate characteristic curves at and close to the zero flow rate in FIG. 5.
Figure 7:
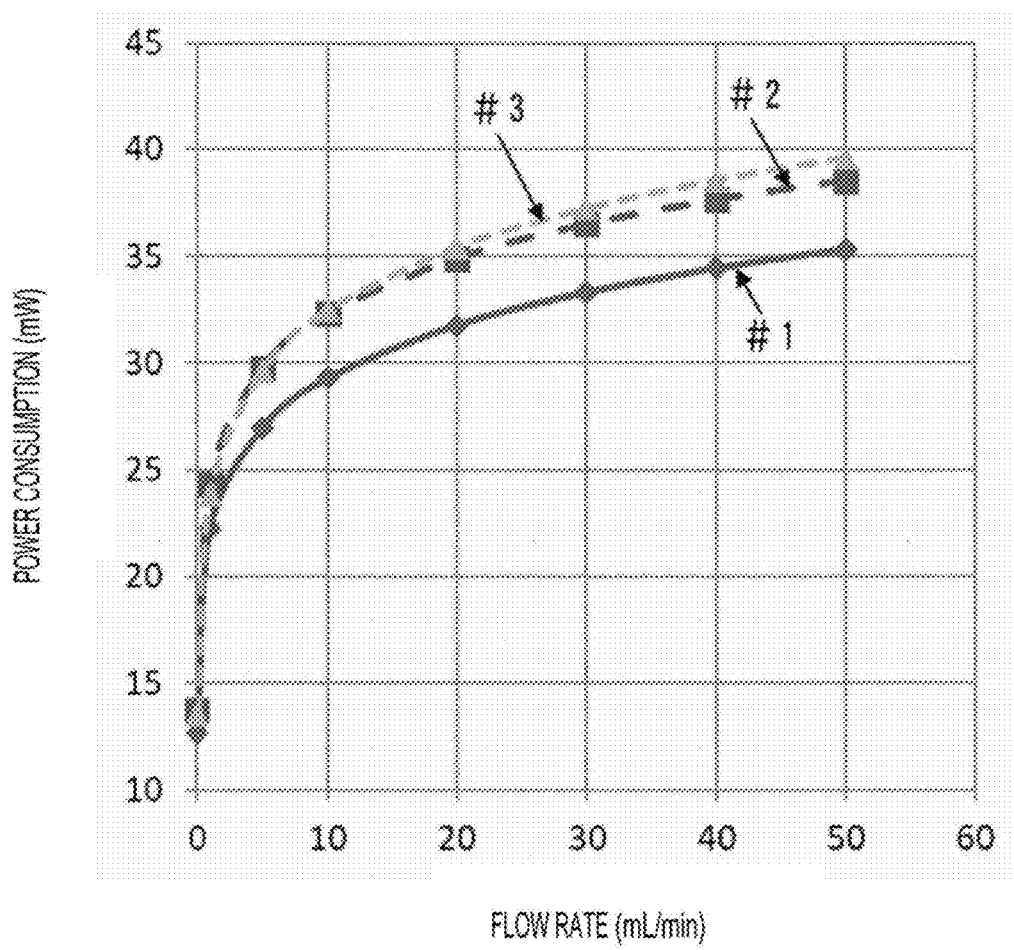
FIG. 7 is a graph illustrating the relationships between the heater power consumptions and the flow rates of a second fluid flowing through the tubes of the three thermal flowmeters.
Figure 8:
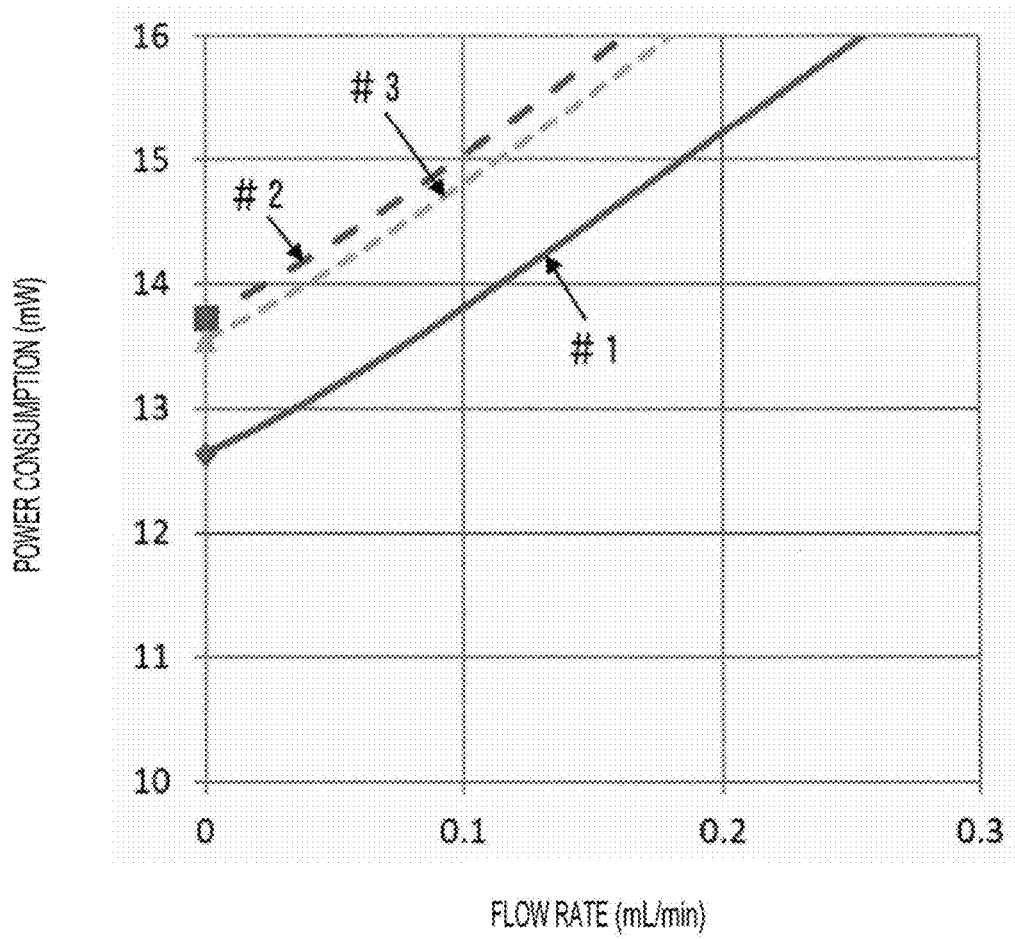
FIG. 8 is an enlarged graph illustrating the heater power consumption versus flow rate characteristic curves at and close to the zero flow rate in FIG. 7.

FIGS. 5 to 12 illustrate heater power consumptions associated with four different fluids (liquids) actually determined by using three thermal flowmeters. FIG. 5 is a graph illustrating the relationships between the heater power consumptions and the flow rates of a first fluid flowing through tubes of the three thermal flowmeters. FIG. 6 is an enlarged graph illustrating the heater power consumption versus flow rate characteristic curves at and close to the zero flow rate in FIG. 5. FIG. 7 is a graph illustrating the relationships between the heater power consumptions and the flow rates of a second fluid flowing through the tubes of the three thermal flowmeters. FIG. 8 is an enlarged graph illustrating the heater power consumption versus flow rate characteristic curves at and close to the zero flow rate in FIG. 7.

Figure 9:
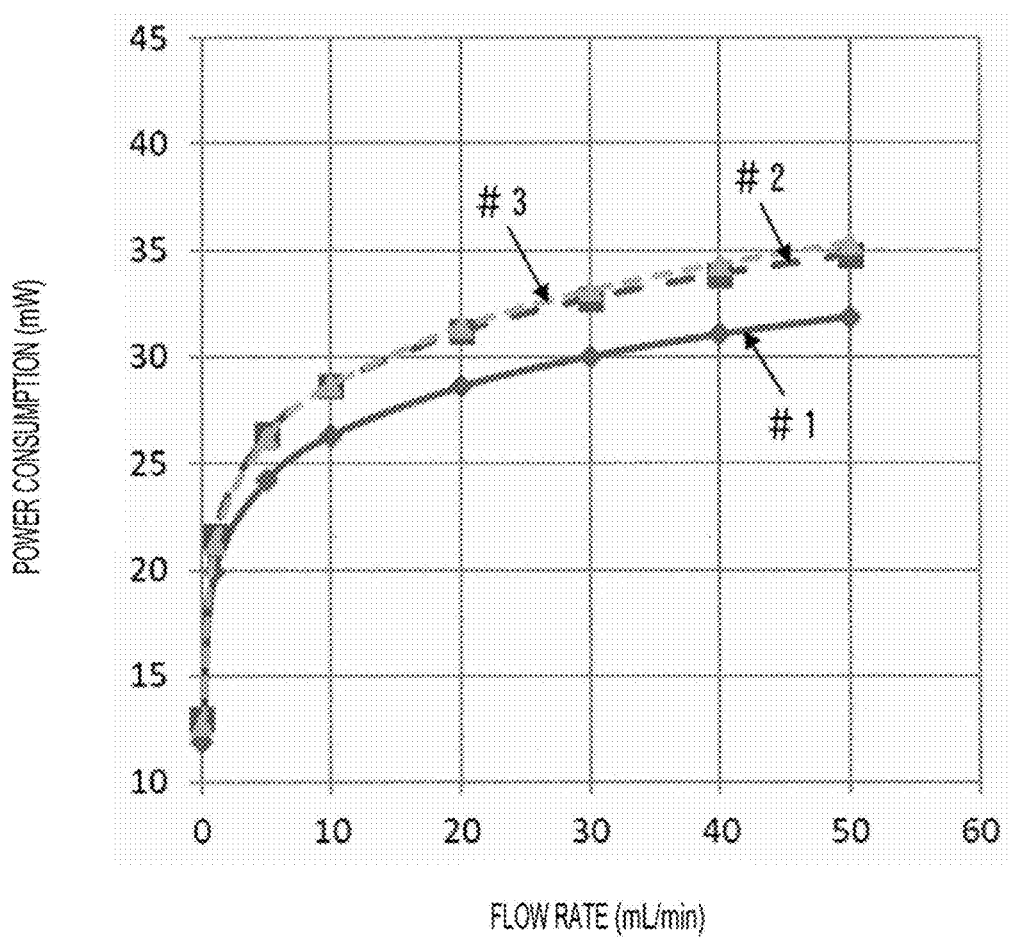
FIG. 9 is a graph illustrating the relationships between the heater power consumptions and the flow rates of a third fluid flowing through the tubes of the three thermal flowmeters.
Figure 10:
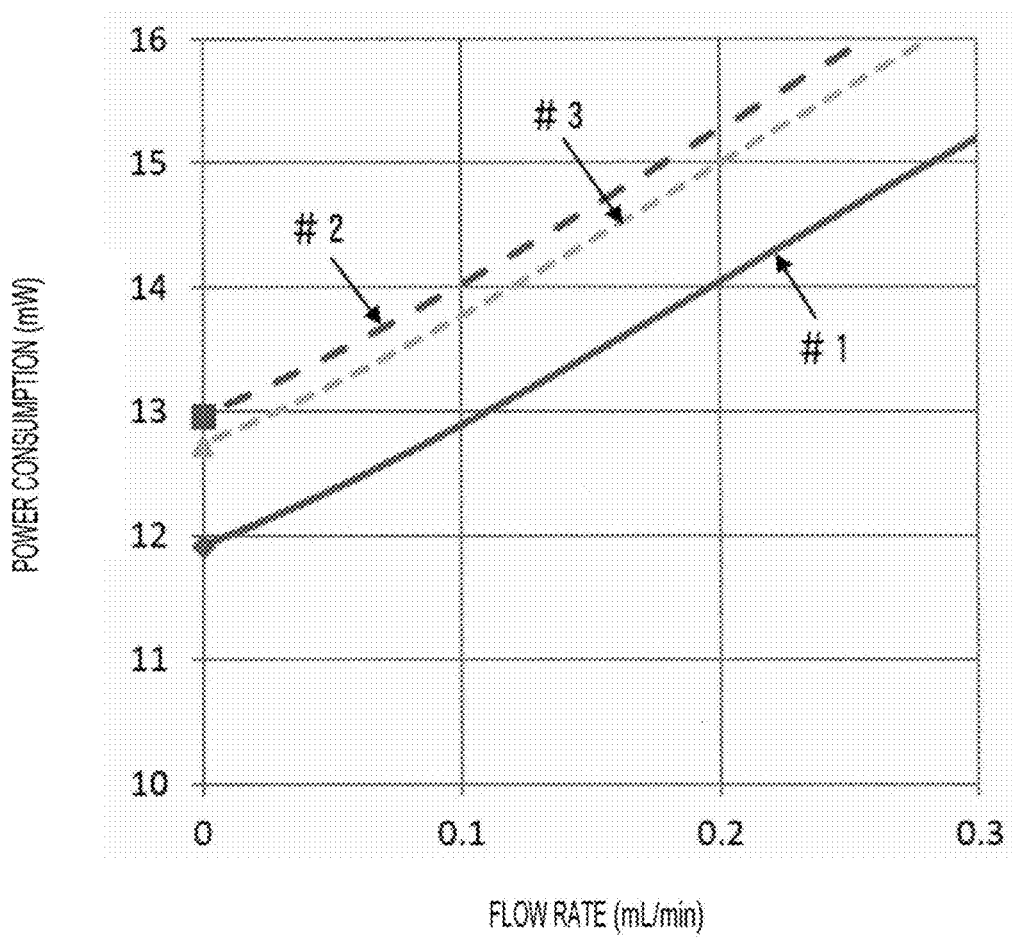
FIG. 10 is an enlarged graph illustrating the heater power consumption versus flow rate characteristic curves at and close to the zero flow rate in FIG. 9.
Figure 11:
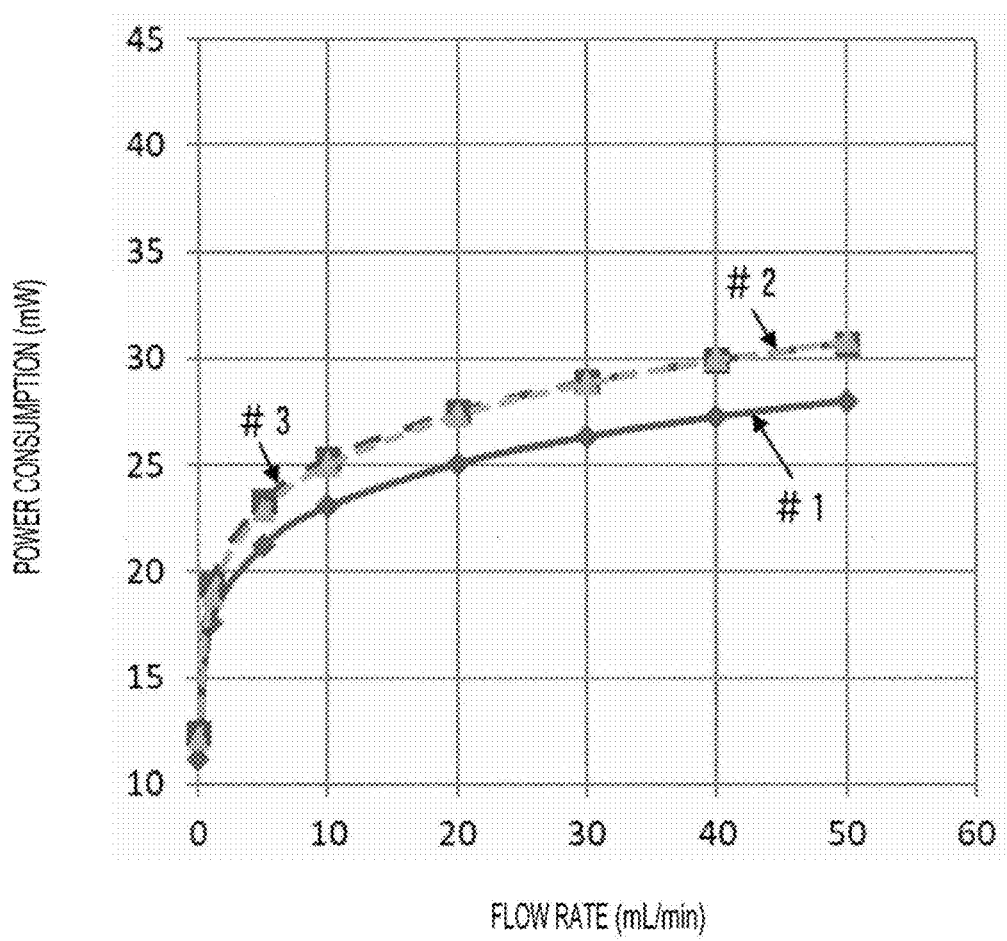
FIG. 11 is a graph illustrating the relationships between the heater power consumptions and the flow rates of a fourth fluid flowing through the tubes of the three thermal flowmeters.
Figure 12:
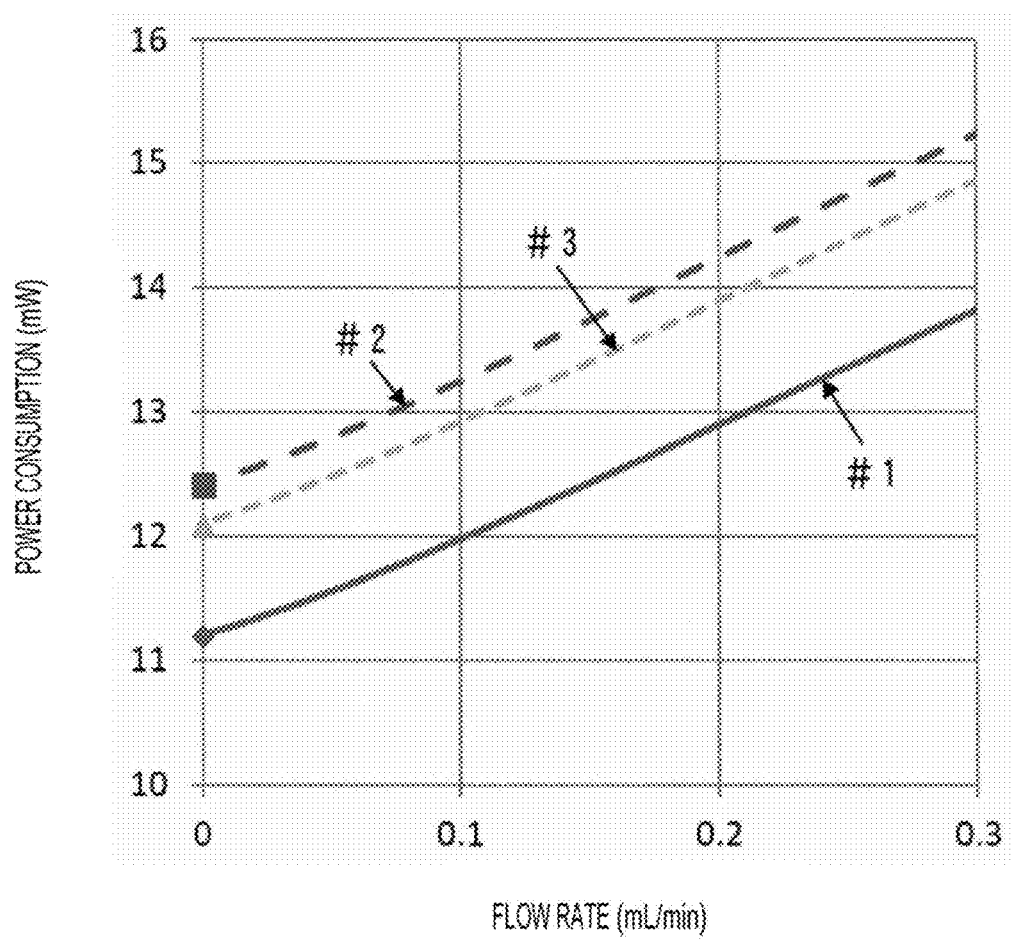
FIG. 12 is an enlarged graph illustrating the heater power consumption versus flow rate characteristic curves at and close to the zero flow rate in FIG. 11.

FIG. 9 is a graph illustrating the relationships between the heater power consumptions and the flow rates of a third fluid flowing through the tubes of the three thermal flowmeters. FIG. 10 is an enlarged graph illustrating the heater power consumption versus flow rate characteristic curves at and close to the zero flow rate in FIG. 9. FIG. 11 is a graph illustrating the relationships between the heater power consumptions and the flow rates of a fourth fluid flowing through the tubes of the three thermal flowmeters. FIG. 12 is an enlarged graph illustrating the heater power consumption versus flow rate characteristic curves at and close to the zero flow rate in FIG. 11.

In FIGS. 5 to 12, #1 represents the heater power consumption versus flow rate characteristic curve obtained by using a first thermal flowmeter, #2 represents the heater power consumption versus flow rate characteristic curve obtained by using a second thermal flowmeter, and #3 represents the heater power consumption versus flow rate characteristic curve obtained by using a third thermal flowmeter.

As is evident from these figures, the heater power consumption differs from thermal flowmeter to thermal flowmeter for the same fluid. The same applies to the zero-point heater power consumption.

Figure 13:
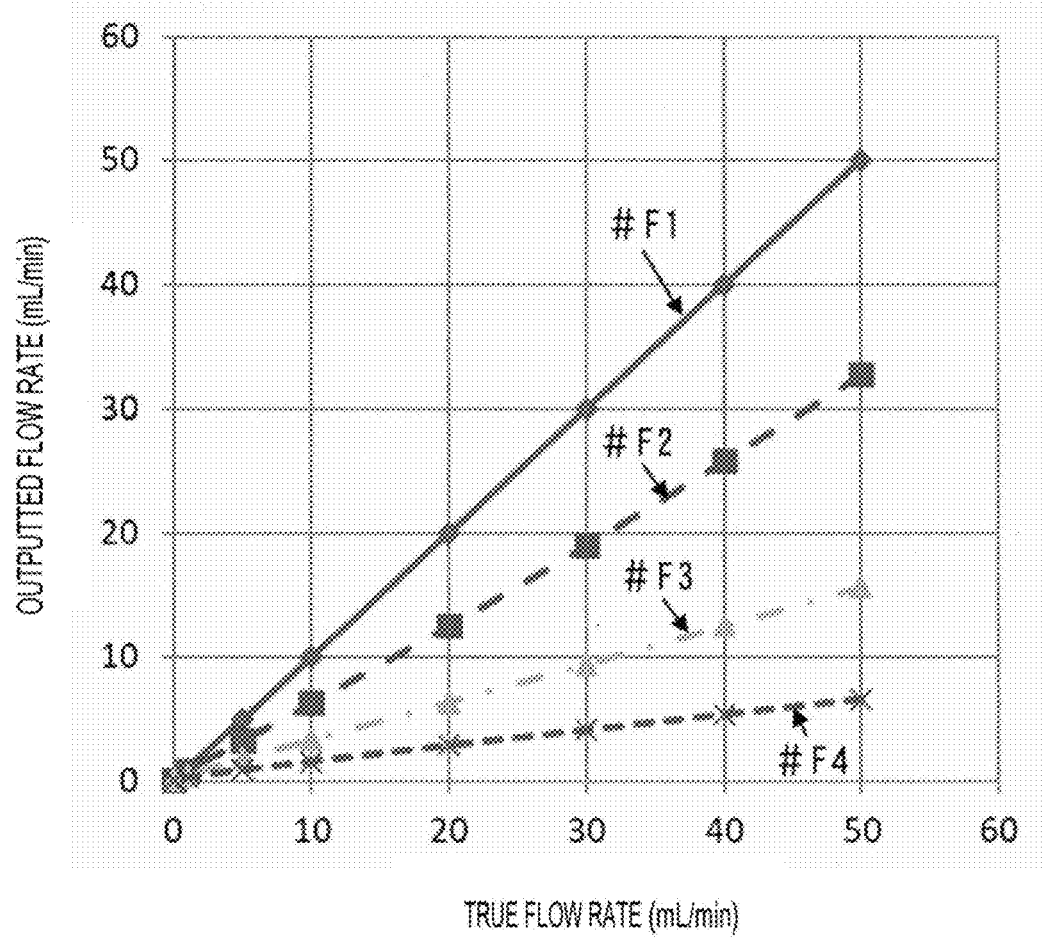
FIG. 13 is a graph illustrating the relationships between true flow rates of the first to fourth fluids and flow rates outputted from a thermal flowmeter where each fluid was caused to flow through a tube of the flowmeter after a flow rate conversion formula or table adjusted for the first fluid was set.

FIG. 13 illustrates the relationships between true flow rates (actual flow rates) of the first to fourth fluids and flow rates outputted from a thermal flowmeter where each fluid was caused to flow through the tube 1 after a flow rate conversion formula or table adjusted for the first fluid was set. In FIG. 13, # F1 represents the flow rate of the first fluid flowing through the tube 1, # F2 represents the flow rate of the second fluid flowing through the tube 1, # F3 represents the flow rate of the third fluid flowing through the tube 1, and # F4 represents the flow rate of the fourth fluid flowing through the tube 1.

FIG. 13 demonstrates that, since the flow rate conversion formula or table was adjusted for the first fluid, the outputted flow rates of the first fluid from the thermal flowmeter are correct values but the other outputted flow rates of the second to fourth fluids are not correct.

As used herein, the term "correction" refers to a process of correcting a flow rate to be outputted from a thermal flowmeter, and the term "correction factor" refers to a factor for correction.

Figure 14:
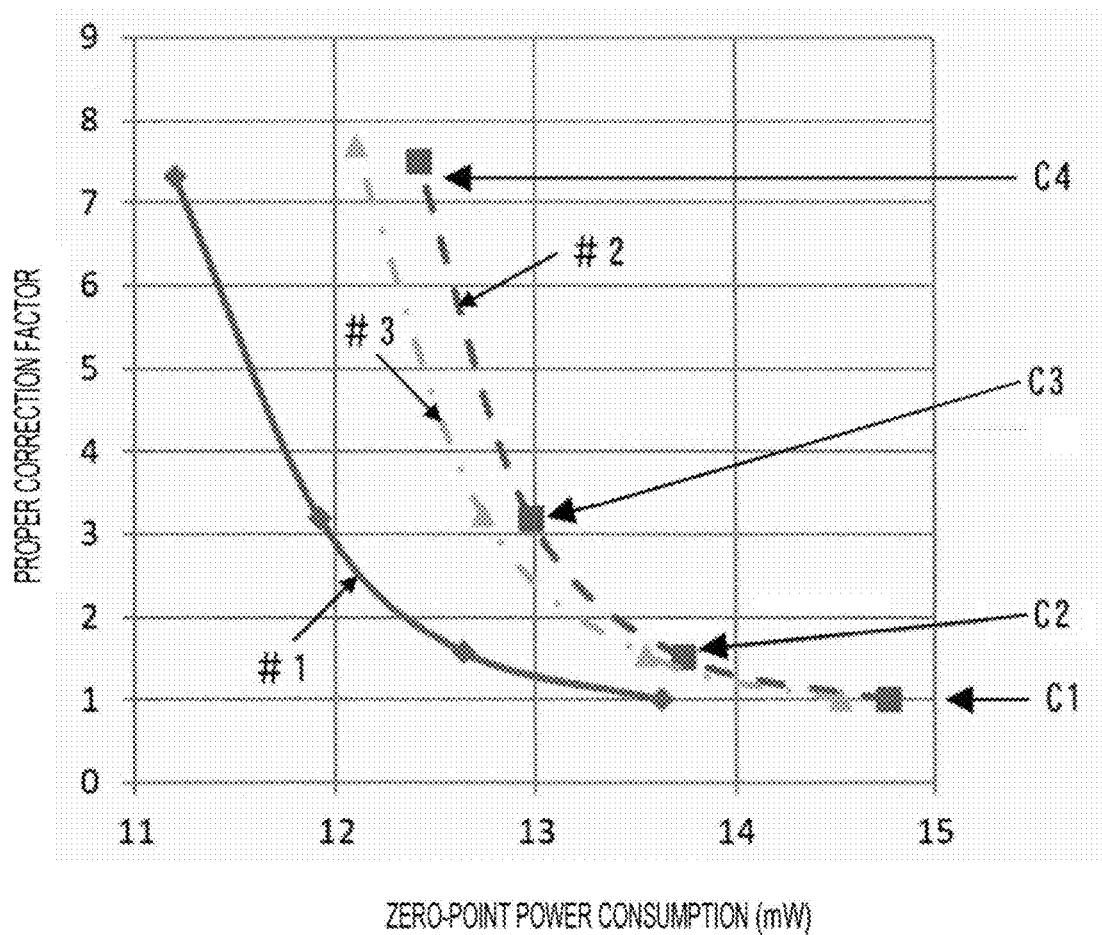
FIG. 14 is a graph illustrating the relationships between correction factors and zero-point heater power consumptions.

FIG. 14 illustrates the relationships between correction factors and zero-point heater power consumptions (sensor outputs in the fluid-stopped state). In a case where a correction factor C (C1 in FIG. 14) for the first fluid is 1, a correction factor C (C2 in FIG. 14) for the second fluid is approximately 1.5, a correction factor C (C3 in FIG. 14) for the third fluid is approximately 3.2, and a correction factor C (C4 in FIG. 14) for the fourth fluid is approximately 7.5. As is clear from FIG. 14, it is difficult to obtain the correction factor based only on the zero-point heater power consumption because of variations between thermal flowmeters.

According to the present disclosure, a zero-point heater power consumption Zero_W associated with a reference fluid, serving as a target for which flow rate conversion is adjusted, is determined and stored in a product, serving as a thermal flowmeter, before shipment.

When another fluid is caused to flow through the tube 1 of the thermal flowmeter, a zero-point heater power consumption Zero_F associated with the other fluid is determined in actual use.

Figure 15:
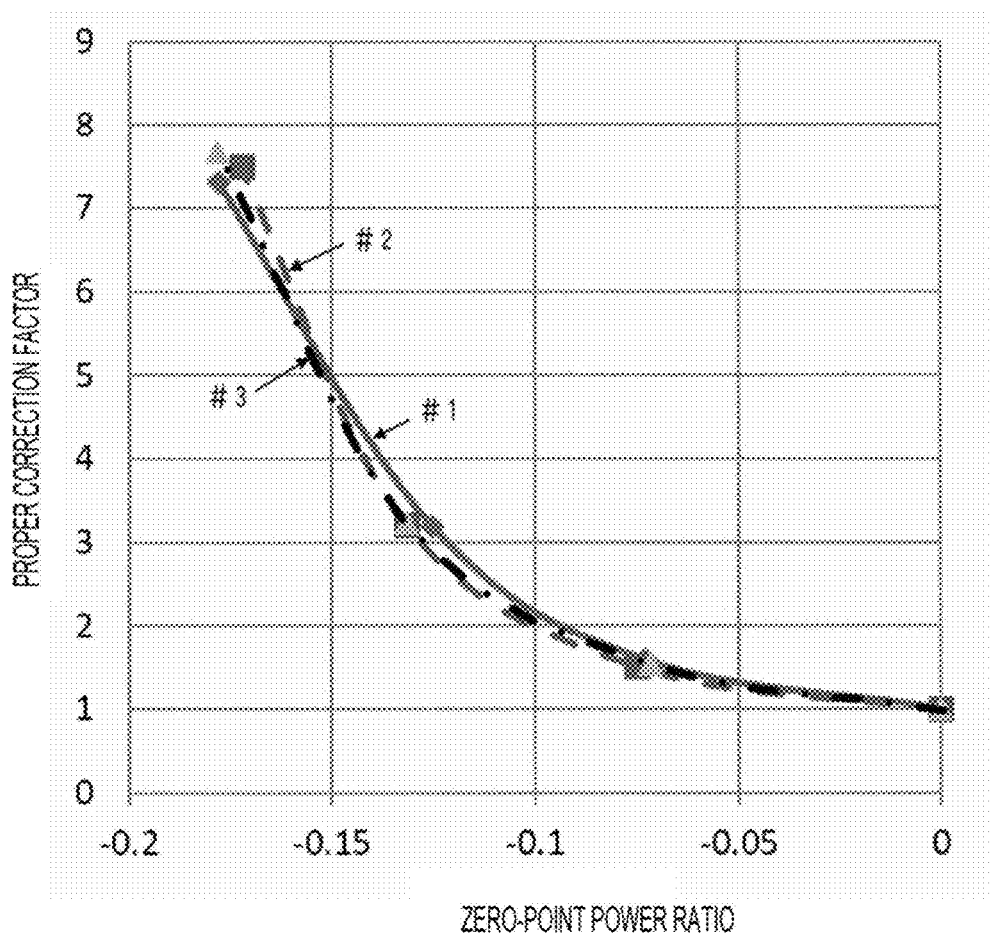
FIG. 15 is a graph illustrating the relationships between the correction factors and zero-point power ratios.

As used herein, the ratio of (Zero_F−Zero_W) to Zero_W, or (Zero_F−Zero_W)/Zero_W, is referred to as a zero-point power ratio x. FIG. 15 illustrates the relationships between the zero-point power ratios x and the correction factors C.

As is evident from FIG. 15, each zero-point power ratio x correlates with the correction factors C without being affected by variations between thermal flowmeters.

Therefore, a correction factor C is calculated from the zero-point power ratio x, a heater power consumption P obtained by causing a fluid to flow through the tube 1 is converted into a flow rate Q using the flow rate conversion formula or table, and the flow rate Q is corrected using the correction factor C. Thus, correction can be achieved without being affected by variations between thermal flowmeters.

Actually, the correction factor C can be obtained from the zero-point power ratio x using the following cubic equation, where a, b, c, and d are known constants.

$$C = ax^3 + bx^2 + cx + d \quad (2)$$

The constants a, b, c, and d can be determined in advance by obtaining the relationships between the zero-point power ratios x and the correction factors C like that illustrated in FIG. 15 in a test using a plurality of thermal flowmeters.

Embodiments

Figure 16:
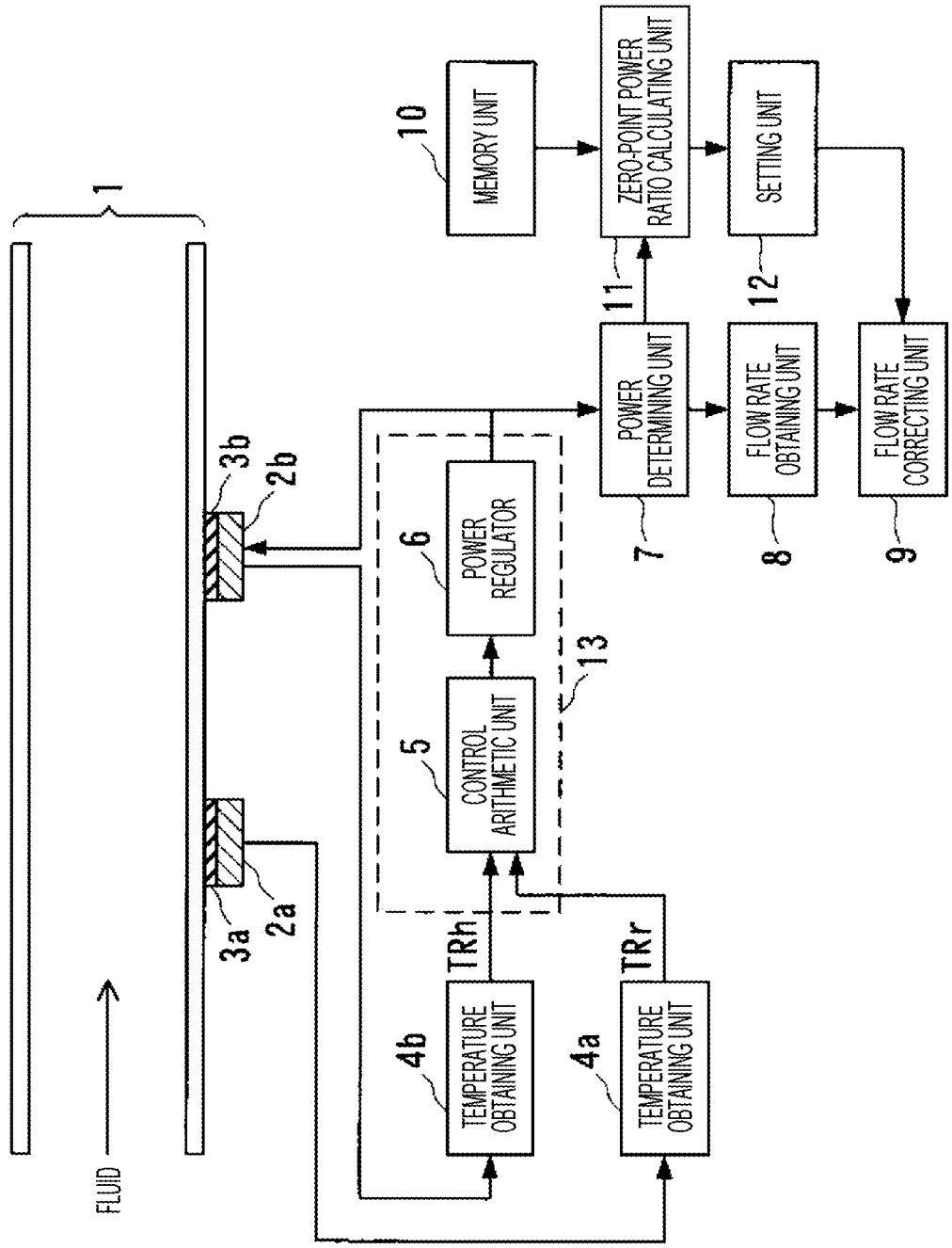
FIG. 16 is a block diagram illustrating an exemplary configuration of a thermal flowmeter according to an embodiment of the present disclosure.

An embodiment of the present disclosure will now be described. FIG. 16 is a block diagram illustrating an exemplary configuration of a thermal flowmeter according to an embodiment of the present disclosure. The thermal flowmeter includes the tube 1 made of, for example, glass, through which a target fluid is caused to flow, the temperature measuring device 2a disposed on the tube 1 and made of, for example, platinum, the heating and temperature measuring device 2b disposed on the tube 1 downstream of the temperature measuring device 2a in a fluid flow direction and made of, for example, platinum, adhesive 3a and 3b fixing the temperature measuring device 2a and the heating and temperature measuring device 2b to the tube 1, a temperature obtaining unit 4a to obtain a temperature TRr of the fluid detected by the temperature measuring device 2a, a temperature obtaining unit 4b to obtain a temperature TRh of the fluid detected by the heating and temperature measuring device 2b, a control arithmetic unit 5 to calculate an operation amount to maintain a temperature difference (TRh−TRr) constant, a power regulator 6 to supply power based on the operation amount to the heating and temperature measuring device 2b to generate heat, a power determining unit 7 to determine a power consumption of the heating and temperature measuring device 2b, a flow rate obtaining unit 8 to convert the power consumption determined by the power determining unit 7 into a flow rate, a flow rate correcting unit 9 to correct the flow rate obtained by the flow rate obtaining unit 8 using a set correction factor, a memory unit 10 storing, as a first zero-point power consumption, a power consumption obtained under conditions where the tube 1 is filled with a reference fluid and the flow of the reference fluid is stopped, a zero-point power ratio calculating unit 11 to calculate a zero-point power ratio based on the first zero-point power consumption and a second zero-point power consumption that is a power consumption determined by the power determining unit 7 under conditions where the flow of the target fluid in the tube 1 is stopped, and a setting unit 12 to calculate the correction factor based on the zero-point power ratio and set the correction factor in the flow rate correcting unit 9. The control arithmetic unit 5 and the power regulator 6 constitute a controller 13.

Each of the temperature measuring device 2a and the heating and temperature measuring device 2b is disposed on a silicon wafer. The silicon wafer is adhered to the tube 1 such that a surface of the silicon wafer on which the temperature measuring device 2a is disposed faces an outer wall of the tube 1, so that the temperature measuring device 2a is fixed to the tube 1. The heating and temperature measuring device 2b is fixed in the same way as the temperature measuring device 2a.

Figure 17:
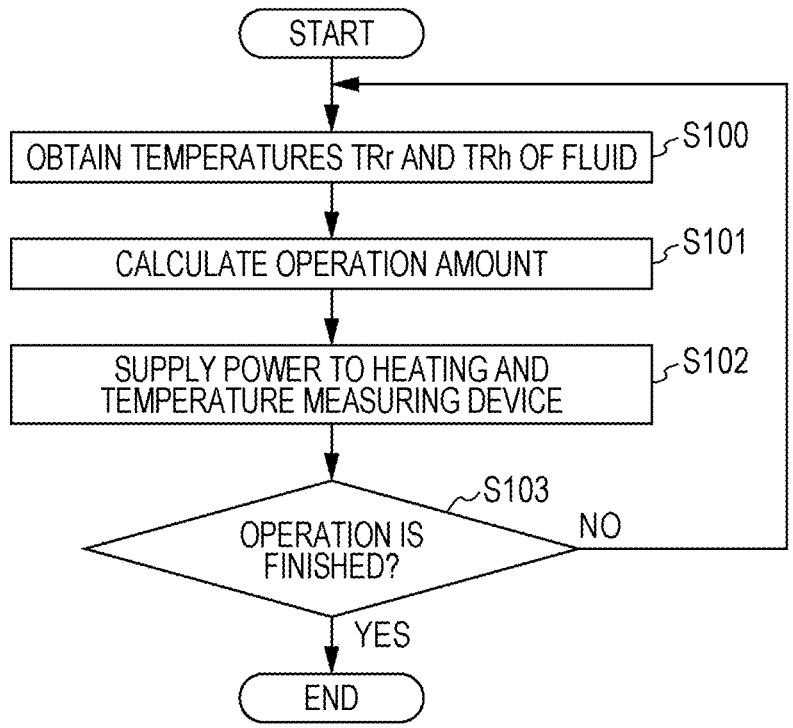
FIG. 17 is a flowchart illustrating a process performed by temperature obtaining units, a control arithmetic unit, and a power regulator of the thermal flowmeter according to the embodiment of the present disclosure.

An operation of the thermal flowmeter according to this embodiment will now be described. FIG. 17 is a flowchart illustrating a process performed by the temperature obtaining units 4a and 4b, the control arithmetic unit 5, and the power regulator 6.

The temperature obtaining units 4a and 4b obtain the temperatures TRr and TRh of a fluid flowing through the tube 1, respectively (step S100 in FIG. 17). Specifically, the temperature obtaining units 4a and 4b detect a resistance of the temperature measuring device 2a and a resistance of the heating and temperature measuring device 2b, respectively, and obtain the temperatures TRr and TRh of the fluid from the relationship between resistance and temperature.

The control arithmetic unit 5 calculates an operation amount so that the temperature difference (TRh−TRr), obtained by subtracting the temperature TRr of the fluid at an upstream position from the temperature TRh of the fluid at a downstream position, is maintained at a constant value (control target value, for example, 10° C.) (step S101 in FIG. 17). Examples of control arithmetic algorithms for operation amount calculation include a proportional-integral-derivative (PID) algorithm.

The power regulator 6 supplies power based on the operation amount calculated by the control arithmetic unit 5 to the heating and temperature measuring device 2b to generate heat (step S102 in FIG. 17).

The process including steps S100 to S102 is performed every control period until the operation of the thermal flowmeter is finished (YES in step S103 in FIG. 17). The temperature TRh of the fluid at the downstream position is adjusted to a temperature that is higher than the temperature TRr of the fluid at the upstream position by a predetermined value.

Figure 18:
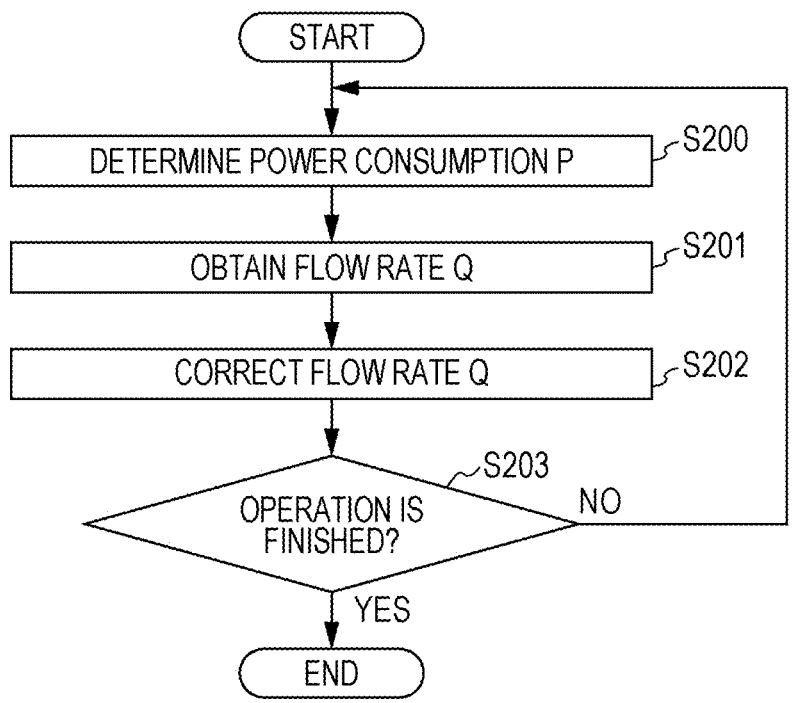
FIG. 18 is a flowchart illustrating a process performed by a power determining unit, a flow rate obtaining unit, and a flow rate correcting unit of the thermal flowmeter according to the embodiment of the present disclosure.

FIG. 18 is a flowchart illustrating a process performed by the power determining unit 7, the flow rate obtaining unit 8, and the flow rate correcting unit 9. The power determining unit 7 determines a power consumption P of the heating and temperature measuring device 2b (step S200 in FIG. 18). The power determining unit 7 calculates the power consumption P of the heating and temperature measuring device 2b on the basis of, for example, a voltage V applied from the power regulator 6 to the heating and temperature measuring device 2b and a resistance Rh of the heating and temperature measuring device 2b, by using the following equation.

$$P=V^2/Rh \tag{3}$$

The power consumption P necessary to cause the temperature TRh of the fluid at the downstream position to be higher than the temperature TRr at the upstream position by a predetermined value can be obtained in the above-described manner.

The flow rate obtaining unit 8 converts the power consumption P, determined by the power determining unit 7, into a flow rate using a set flow rate conversion formula, thus obtaining the flow rate Q of the target fluid (step S201 in FIG. 18). If a flow rate conversion table including flow rates Q corresponding to power consumptions P is set instead of the flow rate conversion formula used to convert the power consumption P into the flow rate Q, the flow rate obtaining unit 8 may obtain the flow rate Q corresponding to the power consumption P from the flow rate conversion table. The flow rate conversion formula or table is adjusted for the reference fluid (e.g., $H_2O$). In other words, the flow rate conversion formula or table is adjusted so that the flow rate Q obtained by the flow rate obtaining unit 8 is correct when the reference fluid is caused to flow through the tube 1.

The flow rate correcting unit 9 multiplies the flow rate Q, obtained by the flow rate obtaining unit 8, by a set correction factor C to correct the flow rate Q (step S202 in FIG. 18). An initial value of the correction factor C is 1, which is set for the reference fluid.

The power determining unit 7, the flow rate obtaining unit 8, and the flow rate correcting unit 9 perform the process including steps S200 to S202 at regular time intervals until the operation of the thermal flowmeter is finished (YES in step S203 in FIG. 18).

Figure 19:
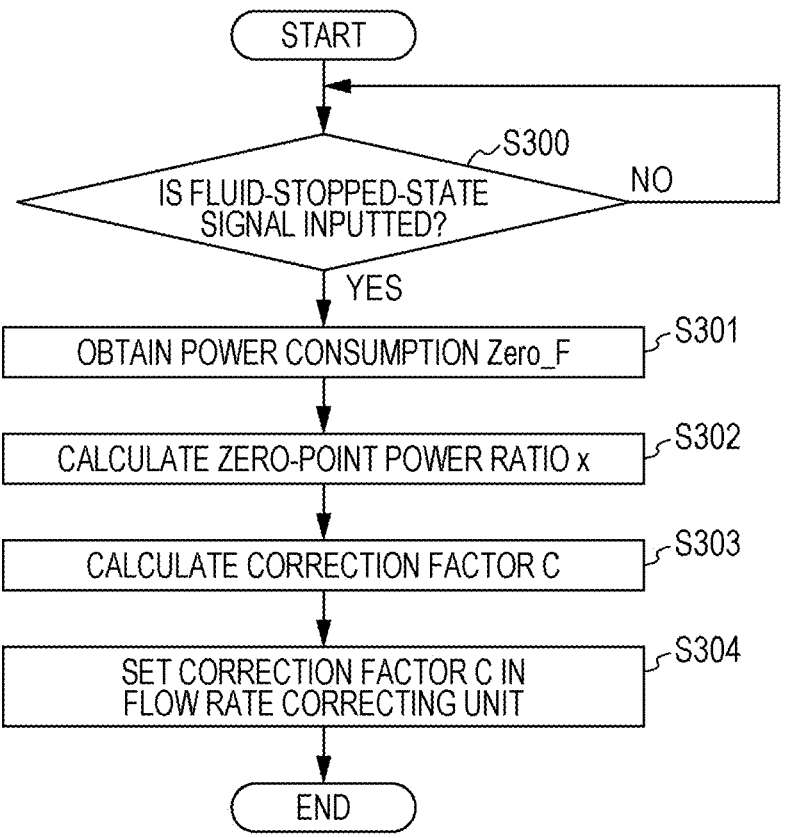
FIG. 19 is a flowchart illustrating a process performed by a zero-point power ratio calculating unit and a setting unit of the thermal flowmeter according to the embodiment of the present disclosure.

FIG. 19 is a flowchart illustrating a process performed by the zero-point power ratio calculating unit 11 and the setting unit 12. The zero-point power ratio calculating unit 11 calculates a zero-point power ratio x based on a power consumption (zero-point heater power consumption Zero_F) of the heating and temperature measuring device 2b under conditions where the flow of the target fluid in the tube 1 is stopped. The setting unit 12 calculates the correction factor C from the zero-point power ratio x.

The user closes valves (not illustrated) arranged upstream and downstream of the tube 1 of the thermal flowmeter in the fluid flow direction to stop the flow of the fluid when the fluid is fed to the thermal flowmeter for the first time, just after the user changes the kind of fluid, or when the kind of fluid seems to have been changed. Then, the user inputs a fluid-stopped-state signal, indicating that the flow of the fluid is stopped, to the thermal flowmeter.

The memory unit 10 stores the zero-point heater power consumption Zero_W (first zero-point power consumption) obtained under conditions where the tube 1 is filled with the reference fluid.

When the fluid-stopped-state signal is inputted from the outside (YES in step S300 in FIG. 19), the zero-point power ratio calculating unit 11 obtains the zero-point heater power consumption Zero_F (second zero-point power consumption) determined by the power determining unit 7 (step S301 in FIG. 19), and calculates the zero-point power ratio x=(Zero_F−Zero_W)/Zero_W based on the obtained zero-point heater power consumption Zero_F and the zero-point heater power consumption Zero_W stored in the memory unit 10 (step S302 in FIG. 19).

Then, the setting unit 12 calculates the correction factor C from the zero-point power ratio x using Equation (2) (step S303 in FIG. 19). The setting unit 12 sets the calculated correction factor C in the flow rate correcting unit 9 (step S304 in FIG. 19).

The correction factor C is set as described above. This enables flow rate correction to be achieved without being affected by variations between thermal flowmeters. At the completion of setting of the correction factor C, the user may open the valves arranged upstream and downstream of the tube 1 to restart the flow of the fluid.

The effects of variations between thermal flowmeters are equally likely to occur in any kind of fluid. According to the embodiment, the zero-point power ratio x is calculated, and the correction factor C is calculated from the zero-point power ratio x. The correction factor C can be used to reduce the effects of variations between thermal flowmeters on the accuracy of determination. The flow rate can be accurately determined if the fluid flowing through the tube 1 is changed to another fluid. In the embodiment, since the setting unit 12 automatically sets the correction factor C, the user can readily set up the thermal flowmeter by merely stopping the flow of a fluid when the fluid is fed to the flowmeter for the first time, just after the user changes the kind of fluid, or when the kind of fluid seems to have been changed.

Although the zero-point power ratio x=(Zero_F−Zero_W)/Zero_W is used in the embodiment, the zero-point power ratio x=Zero_F/Zero_W may be used.

Figure 20:
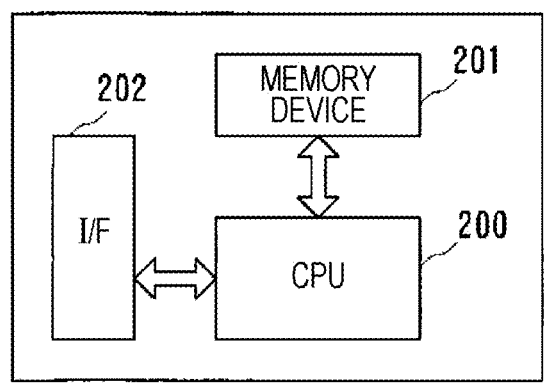
FIG. 20 is a block diagram illustrating an exemplary configuration of a computer that achieves the thermal flowmeter according to the embodiment of the present disclosure.
Figure 21:
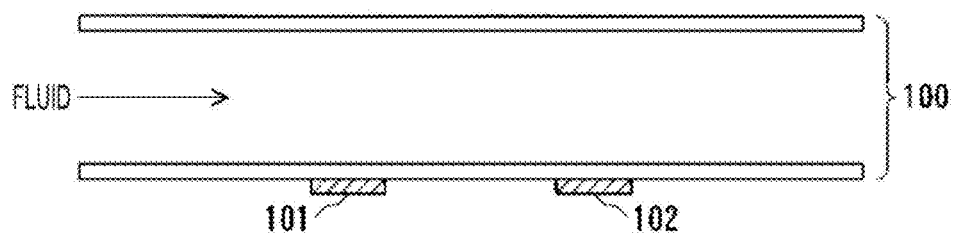
FIG. 21 is a diagram illustrating the principle of a thermal flowmeter.
Figure 22:
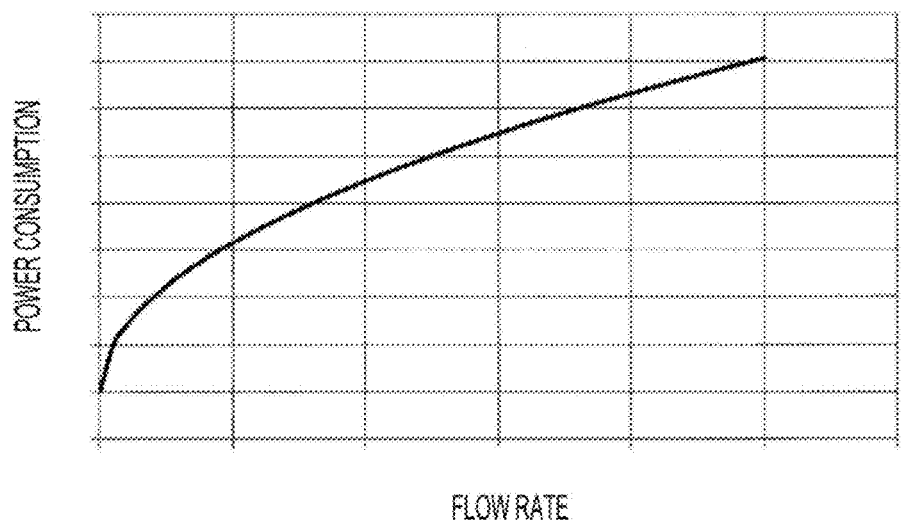
FIG. 22 is a graph illustrating an example of the relationship between the power consumption of a heater and the flow rate of a fluid in a thermal flowmeter.

In the thermal flowmeter according to the embodiment, at least the control arithmetic unit 5, the flow rate obtaining unit 8, the flow rate correcting unit 9, the memory unit 10, the zero-point power ratio calculating unit 11, and the setting unit 12 can be achieved by a computer including a central processing unit (CPU), a memory device, and an interface and a program that controls these hardware resources. FIG. 20 illustrates an exemplary configuration of the computer. The computer includes a CPU 200, a memory device 201, and an interface device (hereinafter, abbreviated to I/F) 202. The I/F 202 is connected to the temperature obtaining units 4a and 4b, the power regulator 6, and the power determining unit 7. In the computer, a program to achieve a method of flow rate correction according to the present disclosure is stored in the memory device 201. The CPU 200 executes the above-described processes based on the program stored in the memory device 201.

The present disclosure is applicable to a thermal flowmeter.

What is claimed is:

1. A thermal flowmeter comprising:
a tube through which a target fluid is caused to flow;
a temperature measuring device disposed on the tube, the temperature measuring device being configured to detect a first temperature of the fluid;
a heating and temperature measuring device disposed on the tube downstream of the temperature measuring device in a fluid flow direction, the heating and temperature measuring device being configured to detect a second temperature of the fluid;
a controller configured to supply power to the heating and temperature measuring device to generate heat such that the second temperature is higher than the first temperature by a predetermined value;
a power determining unit configured to determine a power consumption of the heating and temperature measuring device;
a flow rate obtaining unit configured to convert the determined power consumption into a flow rate of the target fluid;
a flow rate correcting unit configured to correct the flow rate using a set correction factor;
a memory unit storing, as a first zero-point power consumption, a power consumption obtained under conditions where the tube is filled with a reference fluid and flow of the reference fluid is stopped;
a zero-point power ratio calculating unit configured to calculate a zero-point power ratio based on the first zero-point power consumption and a second zero-point power consumption that is a power consumption determined by the power determining unit under conditions where flow of the target fluid in the tube is stopped; and
a setting unit configured to calculate the correction factor based on the zero-point power ratio and set the correction factor in the flow rate correcting unit.

2. The thermal flowmeter according to claim 1,
wherein the flow rate obtaining unit converts the determined power consumption into the flow rate of the target fluid using a set flow rate conversion formula or table, and
wherein the flow rate conversion formula or table is previously adjusted for the reference fluid.

3. The thermal flowmeter according to claim 1, wherein the zero-point power ratio calculating unit obtains the first zero-point power consumption stored in the memory unit and the second zero-point power consumption determined by the power determining unit in response to an inputted fluid-stopped-state signal indicating that the flow of the target fluid is stopped, and calculates the zero-point power ratio based on the first and second zero-point power consumptions.

4. The thermal flowmeter according to claim 3, wherein the zero-point power ratio calculating unit calculates the zero-point power ratio as (Zero_F−Zero_W)/Zero_W or Zero_F/Zero_W where Zero_W denotes the first zero-point power consumption and Zero_F denotes the second zero-point power consumption.

5. The thermal flowmeter according to claim 1, wherein the setting unit calculates the correction factor from the zero-point power ratio using a predetermined cubic equation.

6. A method of flow rate correction for a thermal flowmeter including a tube through which a target fluid is caused to flow, a temperature measuring device that is disposed on the tube and detects a first temperature of the target fluid, and a heating and temperature measuring device that is disposed on the tube downstream of the temperature measuring device in a fluid flow direction and detects a second temperature of the target fluid, the method comprising:
a first step of supplying power to the heating and temperature measuring device to generate heat such that the second temperature is higher than the first temperature by a predetermined value;
a second step of determining a power consumption of the heating and temperature measuring device;
a third step of converting the determined power consumption into a flow rate of the target fluid;
a fourth step of correcting the flow rate using a set correction factor;
a fifth step of obtaining a first zero-point power consumption from a memory unit and calculating a zero-point power ratio based on the first zero-point power consumption and a second zero-point power consumption, the first zero-point power consumption being a power consumption determined under conditions where the tube is filled with a reference fluid and flow of the reference fluid is stopped, the second zero-point power consumption being a power consumption determined in the second step under conditions where flow of the target fluid in the tube is stopped; and
a sixth step of calculating the correction factor based on the zero-point power ratio and setting the correction factor as that to be used in the fourth step.

7. The method according to claim 6,
wherein the third step includes converting the determined power consumption into the flow rate of the target fluid using a set flow rate conversion formula or table, and
wherein the flow rate conversion formula or table is previously adjusted for the reference fluid.

8. The method according to claim 6, wherein the fifth step includes obtaining the first zero-point power consumption stored in the memory unit and the second zero-point power consumption determined in the second step in response to an inputted fluid-stopped-state signal indicating that the flow of the target fluid is stopped and calculating the zero-point power ratio based on the first and second zero-point power consumptions.

9. The method according to claim 8, wherein the fifth step includes calculating the zero-point power ratio as (Zero_F−Zero_W)/Zero_W or Zero_F/Zero_W where Zero_W denotes the first zero-point power consumption and Zero-_F denotes the second zero-point power consumption.

10. The method according to claim 6, wherein the sixth step includes calculating the correction factor from the zero-point power ratio using a predetermined cubic equation.

* * * * *